(No Model.)

G. E. O'NEILL.
PACKING.

No. 596,303. Patented Dec. 28, 1897.

WITNESSES:
M. V. Bidgood
Geo. H. Knight Jr.

INVENTOR
George E. O'Neill
BY
Harry E. Knight
ATTORNEY

UNITED STATES PATENT OFFICE.

GEORGE E. O'NEILL, OF NEW YORK, N. Y.

PACKING.

SPECIFICATION forming part of Letters Patent No. 596,303, dated December 28, 1897.

Application filed July 20, 1897. Serial No. 645,288. (No model.)

*To all whom it may concern:*

Be it known that I, GEORGE E. O'NEILL, a citizen of the United States, residing at New York, county and State of New York, have invented a certain new and Improved Packing, of which the following is a specification.

This invention relates to improvements in packings, and is applicable to any and all joints that have to withstand pressures, such as steam or hydraulic joint packings.

My invention consists in a solid packing material, preferably metallic, sufficiently soft to flow under high pressure and arranged in a channel or channels around the joint, with means for bringing pressure to bear upon a part of it by a piston working in an area smaller than the total area of the channel or channels, whereby the packing is caused to flow and press against the joint-faces, thereby giving a tight packing.

My invention, furthermore, comprises a series of separate channels for the same joint, all communicating with a common chamber containing the solid packing material, so that pressure on said material forces it into all of said channels.

Figure 1:
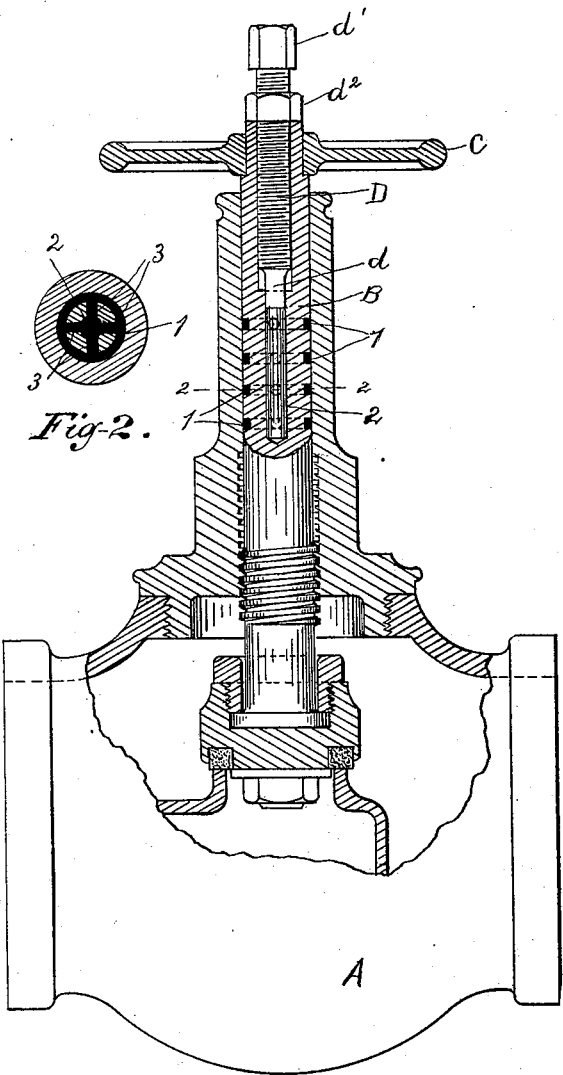
Figure 3:
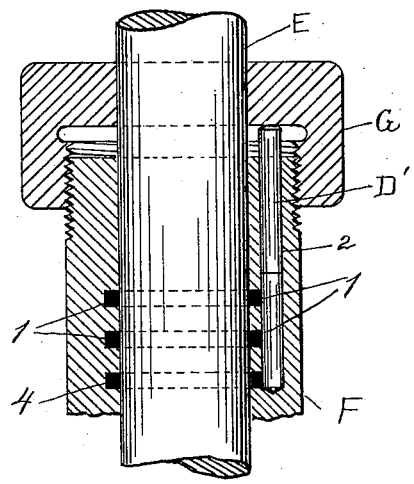
Figure 4:
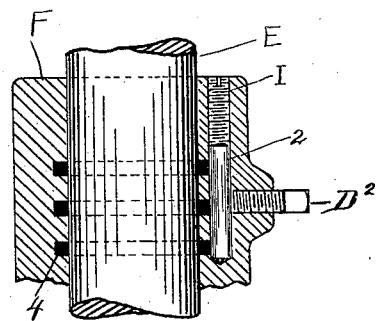

In the accompanying drawings, Figure 1 is a vertical section of a valve-stem packing embodying my invention. Fig. 2 is a cross-section of same on line 2 2 in Fig. 1. Figs. 3 and 4 show modifications.

In Fig. 1, A represents a valve, and B its stem. In this stem at the place where it is to be "packed" are a series of circumferential channels 1, and in the interior of the stem is a chamber 2, communicating with the channels 1 by passages 3. (See Fig. 2.) C is the hand-wheel or handle of the valve, and D is a screw entering the valve-stem from the end and working in a screw-threaded hole therein. An extension $d$ on the lower end of screw D enters chamber 2 and works therein as a piston. The channels 1, passages 3, and chamber 2 contain a solid material, (shown at 4,) such as soft metal capable of flowing under high pressure. When the packing becomes loose or does not sufficiently close the joint, the screw D may be turned so as to cause its lower end to penetrate farther into the chamber 2, forcing some of the metal from chamber 2 into passages 3 and from passages 3 into channels 1, thus tightening the packing. To effect this, the screw D may have a head $d'$ to receive a wrench, and a lock-nut $d^2$ may also be provided to prevent the pressure on the soft metal from working the screw back.

Figs. 3 and 4 show modifications of the packing, the channels here being shown in the outer member of the joint. In said figures, E may represent a piston-rod or other rod to be packed, and F the surrounding wall or casing in which are cut the channels 1. A chamber 2 communicates with all of these channels and both chamber and channels contain soft-metal filling or packing 4. In Fig. 3 a plunger or pin D' rests on this packing and slides in chamber 2, and a screw-cap G, screwing onto the casing F, bears against this plunger and forces it against the packing material 4. The latter may thus be caused to flow into the channels 1, so as to tighten the joint.

In both Figs. 1 and 3 the pressure is applied at the end of the chamber 2, but, as shown in Fig. 4, it may be applied by a screw $D^2$, entering at the side of the chamber, the end of the chamber in this case being filled or closed by a screw-plug I.

It will be understood that when the soft metal has been forced from chamber 2 into channels 1 to such an extent as to leave an insufficient quantity of metal in chamber 2 the screw D in Fig. 1, plug D', Fig. 3, or screw-plug I, Fig. 4, may be removed and an additional supply of soft metal be inserted in any convenient form.

I have here shown my invention as applied to rod-packings; but it is clearly applicable to sliding joints of whatever description, be they round or flat, the channel in every case being made in one of the joining surfaces and means being provided for forcing soft metal into it. For example, it is applicable to the faces or sides of flat slide-valves. In any case, however, the total cross-section of the channels taken across the direction of flow of the metal will be greater than the area of the compressing-piston, so that a given motion of the piston will, while producing a smaller linear motion of the packing, exert the same pressure per square inch over a larger surface, and the effect of the piston will therefore be increased as regards the total pressure—that is, the product of pressure in the direction of flow and of the area over which it is applied. Owing, therefore, to the small area of the part applying pressure and to the solid nature of the packing material, an extremely high pressure may be brought to bear on the packing, and the joint may thus be made tight at the highest working pressures of steam, pneumatic, or hydraulic machinery. A very important advantage of the construction is that the packing may be tightened while the machinery is in operation.

The provision of a separate chamber which receives the packing and from which the packing is forced into a plurality of channels has the advantage that a single plug of packing may be put into the chamber and forced into all of the channels and the more important advantage that the pressure on the several channels is thereby equalized. With a soft packing metal it is extremely desirable to arrange it in separate grooves or channels, so as to properly support it and to facilitate lubrication. If now a separate feeding and compressing device were applied to the packing in each of these channels, the result would be that as the pressures on the several channels could not be ascertained it would be difficult to make them uniform and one of the channels might have to bear almost all of the pressure, whereby it would be unduly heated; but by feeding all of the channels from a common chamber the pressure must necessarily be the same or approximately the same in all and the most efficient results will therefore be produced.

Having thus described my invention, the following is what I claim as new therein and desire to secure by Letters Patent:

1. In a packing for joints, the combination with two joining members, one of which has channels therein at the joint, of a separate chamber communicating with all of said channels, a solid packing material contained in said channels and chamber, and a piston working in said chamber, against the packing, and having an effective area less than the total area of the channels taken across the direction of flow of the metal, substantially as and for the purpose set forth.

2. In a packing for joints, the combination with two joining members, one of which has separate channels therein at the joint, of a chamber communicating with all of said channels, a solid packing material contained in said channels and chamber and means for applying pressure to the packing material in the chamber.

GEO. E. O'NEILL.

Witnesses:
HARRY E. KNIGHT,
M. V. BIDGOOD.